United States Patent [19]

Bresch

[11] Patent Number: 6,143,843
[45] Date of Patent: Nov. 7, 2000

[54] SIMULATED CONDENSING MODE

[75] Inventor: Saul R. Bresch, New York, N.Y.

[73] Assignee: Union Carbide Chemicals & Plastics Technology Corporation, Danbury, Conn.

[21] Appl. No.: 09/236,265

[22] Filed: Jan. 22, 1999

[51] Int. Cl.$^7$ ........................................... C08F 2/01
[52] U.S. Cl. ............................. 526/68; 526/89; 526/901; 526/88
[58] Field of Search ............................. 526/68, 89, 901; 62/935

[56] References Cited

U.S. PATENT DOCUMENTS

| | | | |
|---|---|---|---|
| 4,336,689 | 6/1982 | Davis | 62/55 |
| 4,343,634 | 8/1982 | Davis | 62/62 |
| 4,422,302 | 12/1983 | Davis et al. | 62/57 |
| 5,541,270 | 7/1996 | Chinh et al. | 526/68 |
| 5,817,866 | 10/1998 | Bristow et al. | 560/245 |

*Primary Examiner*—David W. Wu
*Assistant Examiner*—R. Harlan
*Attorney, Agent, or Firm*—S. R. Bresch

[57] ABSTRACT

A process comprising contacting one or more monomers with a catalyst, in the gas phase, under polymerization conditions, in a fluidized bed reactor, with the proviso that the reactor is at least partially cooled internally by the vaporization of a liquid cryogen directly into the reactor.

11 Claims, No Drawings

SIMULATED CONDENSING MODE

TECHNICAL FIELD

This invention relates to a process for polymerization, which provides a technique for cooling the internals of a fluidized bed reactor.

BACKGROUND INFORMATION

Many industrially successful processes for operating fluidized bed reactors used for the catalytic polymerization of olefins take advantage of "condensing mode" and "super condensing mode" techniques. These techniques are described in detail in U.S. Pat. Nos. 4,543,399; 4,588,790; and 5,352,749. They entail the cooling of gases and/or fluids in the recycle line of a fluidized bed reactor to form a gas and a liquid phase. The two phase mixture is then directed into the fluidized bed as a fluidizing medium, the liquid portion of which vaporizes when it is exposed to the heat of the reactor. The objective is to take advantage of the cooling effect brought about by the vaporization, i.e., by bringing the temperature of the fluidized bed down to a point where degradation of the polymer and the catalyst are avoided and agglomeration of the polymer and chunking are prevented. The liquid phase is provided by a portion of the recycle gases, which includes monomers and low boiling liquid hydrocarbons, inert to the reaction conditions needed for polymerization, and condensation from which the techniques get their names. The amount of liquid hydrocarbons can be as much as 50 percent by weight of the total weight of the fluidizing medium used in the reactor. A commonly used liquid hydrocarbon is isopentane, which boils at about 27 degrees C., and consequently becomes a vapor in the recycle line in view of the heat present in the recycle gases. The recycle gases leave the reactor, are cooled, and then condensed to the extent that a vapor phase and liquid phase are formed. The velocity of the recycled gas/liquid mixture should be sufficient to support the fluidized bed, but slow enough to avoid excessive entrainment of fines. The cooling capacity should be sufficient to improve the production rate in terms of space/time/yield. Present technology accomplishes both.

The negatives reside in the limit placed upon the production rate, i.e., space/time/yield, which is influenced by the maximum rate at which heat can be removed from the reactor; the introduction of hydrocarbons other than monomers, which, although considered inert, can affect the polymer morphology and the static, chunking, and sheeting, which plague many polymerization runs; flooding and frothing at the bottom of the reactor due to too much liquid; and the requirement for additional cooling and condensing equipment for converting the recycle stream to the gas/liquid mixture.

DISCLOSURE OF THE INVENTION

An object of this invention, therefore, is to provide an alternative for those who wish to essentially avoid or reduce the addition of hydrocarbons, other than monomers, to a fluidized bed system, and minimize the other negatives. Other objects and advantages will become apparent hereinafter.

According to the invention, a process has been discovered which meets the above object. The process comprises contacting one or more monomers with a catalyst, in the gas phase, under polymerization conditions, in a fluidized bed reactor, with the proviso that the reactor is at least partially cooled internally by the vaporization of a liquid cryogen directly into the reactor.

DESCRIPTION OF THE PREFERRED EMBODIMENT(S)

This invention contemplates the catalytic polymerization of any monomers, which can be polymerized in the gas phase in a fluidized bed reactor. It will be understood by those skilled in the art that any of the steps, conditions, and equipment proposed for these polymerizations would be expected to be easily adapted to the process, which is the subject of this invention.

One such polymerization is that of olefin monomers, which known "condensing mode" techniques have been applied to, and such polymerizations will be discussed herein as typical. The polyolefins produced by the process of the invention can be homopolymers or copolymers produced from two or more comonomers, or a blend of two or more of these polymers, conventionally used in film, sheet, and tubing, and as jacketing and/or insulating materials in wire and cable applications. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chlorotrifluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetrafluoroethylene. The homopolymers and copolymers of ethylene and propylene are preferred, both in the non-halogenated and halogenated form. The copolymers of ethylene and one or more alpha-olefins can have 3 to 12 carbon atoms, and preferably have 3 to 8 carbon atoms. Included in this preferred group are terpolymers such as ethylene/propylene/diene monomer rubbers. With respect to polypropylene: homopolymers and copolymers of propylene and one or more other alpha-olefins wherein the portion of the copolymer based on propylene is at least about 60 percent by weight based on the weight of the copolymer can be made in subject process using, for example, the steps and conditions of the propylene polymerization described in U.S. Pat. No. 4,414,132. Preferred polypropylene alpha-olefin comonomers are those having 2 or 4 to 12 carbon atoms.

The homopolymers or copolymers of ethylene wherein ethylene is the primary comonomer and the homopolymers and copolymers of propylene wherein propylene is the primary comonomer may be referred to herein as polyethylene and polypropylene, respectively.

The catalyst system can be any of those conventionally used for the polymerization of the particular monomers selected by the operator for the process of the invention. Generally, they will be transition metal catalyst systems, one such system being exemplified by the magnesium/titanium catalyst system described in U.S. Pat. Nos. 4,302,565 or 5,106,926. In this system, the precursor can be supported or unsupported. Another catalyst system is one where the precursor is formed by spray drying and used in slurry form. Such a catalyst precursor, for example, contains titanium, magnesium, and an electron donor, and, optionally, an aluminum halide. The precursor is then introduced into a hydrocarbon medium such as mineral oil to provide the slurry form. This is described in U.S. Pat. No. 5,290,745. Further, the catalyst system can be a vanadium based catalyst system such as that described in U.S. Pat. No. 4,508,842; a chromium based catalyst system such as that described in U.S. Pat. No. 4,101,445; or other transition metal catalyst systems useful in the preparation of polyolefins such as polyethylene and polypropylene. Many of these catalyst systems are often referred to as Ziegler-Natta catalyst systems. Catalyst systems, which use chromium or molybdenum oxides on silica-alumina supports, are also useful. The preferred catalyst systems are magnesium/titanium and metallocene catalyst systems. Examples of metallocene catalyst systems can be found in U.S. Pat. Nos. 5,194,532; 5,227,440; 5,279,999; and 5,317,036. The catalyst system can also utilize prepolymerization if desired. See, for example, U.S. Pat. No. 5,510,433.

With respect to typical magnesium/titanium based catalyst systems used in the production of polyethylene: The electron donor, if used in the catalyst precursor, is an organic Lewis base, liquid at temperatures in the range of about 0 degrees C. to about 200 degrees C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound is optional, but is often used with any of the titanium based catalyst precursors. The activator can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. A particularly preferred activator is a mixture of diethylaluminum chloride and tri-n-hexylaluminum. If it is desired to use an activator, about 0.10 to about 10 moles, and preferably about 0.15 to about 2.5 moles, of activator can be used per mole of electron donor. The molar ratio of activator to titanium can be in the range of about 1:1 to about 10:1 and is preferably in the range of about 2:1 to about 5:1.

The cocatalyst, generally a hydrocarbyl aluminum cocatalyst, can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutyl-hexylaluminum, isobutyl dihexylaluminum, trimethyl-aluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, diisobutylaluminum chloride, and ethylaluminum sesquichloride. The cocatalyst compounds can also serve as activators and modifiers.

In those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

A typical example of a metallocene based catalyst system, which includes a precursor and an aluminoxane cocatalyst, is exemplified as follows:

The precursor can have the following formula:

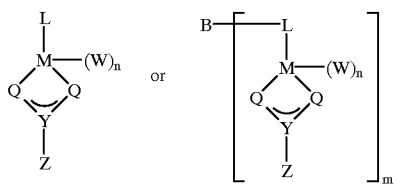

wherein:

M is Zr or Hf;

L is a substituted or unsubstituted, $^1$-bonded ligand;

Q can be the same or different and is independently selected from the group consisting of —O—, —NR—, —CR$_2$— and —S—;

Y is either C or S;

Z is selected from the group consisting of —OR, —NR$_2$, —CR$_3$, —SR, —SiR$_3$, —PR$_2$ or —H, with the proviso that when Q is —NR— then Z is selected from the group consisting of —OR, —NR$_2$, —SR, —SiR$_3$, —PR$_2$ or —H;

n is 1 or 2;

W is a univalent anionic group when n is 2 or W is a divalent anionic group when n is 1;

R can be the same or different and is independently a group containing carbon, silicon, nitrogen, oxygen, and/or phosphorus and one or more R groups may optionally be attached to the L substituent;

B is a bridging group selected from the group consisting of an alkylene or arylene group containing from 1 to 10 carbon atoms; germanium; silicone; and alkyl phosphine; and m is 1 to 7.

Examples of the aluminoxane cocatalyst are methylaluminoxane (MAO) and modified methylaluminoxane (MMAO).

With regard to transition metal catalyst systems in general: The entire catalyst system, which includes the precursor or activated precursor and the cocatalyst, is added to the fluidized bed reactor. The polymerization is conducted in the gas phase using a continuous fluidized process.

Conventional melt indices, flow indices, melt flow ratios, densities, molecular weight distributions, and weight average molecular weights are contemplated for the resins produced by subject process. Melt index is determined under ASTM D-1238, Condition E. It is measured at 190 degrees C. and 2.16 kilograms and reported as grams per 10 minutes. Flow index is determined under ASTM D-1238, Condition F. It is measured at 190 degrees C. and 10 times the weight used in determining the melt index, and reported as grams per 10 minutes. Melt flow ratio is the ratio of flow index to melt index. Molecular weight distribution is reflected in an Mw/Mn ratio wherein Mw is the weight average molecular weight; Mn is the number average molecular weight; and the Mw/Mn ratio can be referred to as the polydispersity index, which is a measure of the breadth of the molecular weight distribution.

In polyethylene production, for example: The pressure, i.e., the total pressure in the reactor, can be in the range of about 200 to about 450 psi and is preferably in the range of about 280 to about 400 psig. The ethylene partial pressure is set according to the amount of copolymer it is desired to produce in the reactor. Typical ethylene partial pressures are at least about 20 psi and often at least about 90 psi. The balance of the total pressure is usually provided by alpha-olefin other than ethylene and an inert gas such as nitrogen, which is also the preferred liquid cryogen. The temperature at which the polymerization can be conducted is generally in the range of about 60 to about 110 degrees C. Preferred operating temperatures vary depending on the density desired, i.e., lower temperatures for lower densities and higher temperatures for higher densities.

Liquid cryogens, which can be used to cool the reactor internally, are inert and can be exemplified by liquid nitrogen (B.P. minus 196 degrees C.), liquid argon (B.P. minus 186 degrees C.), liquid neon (B.P. minus 246 degrees C.), and liquid helium (B.P. minus 260 degrees C.). Liquid nitrogen is preferred. Liquid carbon dioxide can be used provided that it is not mixed with flammable solvents. FREON™ and UCON™ refrigerants are also contemplated provided that they are inert with respect to the polymerization and do not introduce undesirable impurities into the polymer. Note: The terms "liquid cryogen" and "cryogenic fluid" are considered to be synonymous in this specification, the term "fluid" being used to mean liquid.

In the metallurgical arts, it is known to deliver cryogenic fluids to use points such as fluidized beds maintained at temperatures of, for example, minus 100 degrees C. See, for example, U.S. Pat. Nos. 4,343,634 and 4,422,302. Particularly relevant here, however, is U.S. Pat. No. 4,336,689, which discloses a process for delivering a liquid cryogen to a use point such as a wire die cooling apparatus. This technique in modified form can be used to deliver the liquid cryogen to the fluidized bed reactor. It will be understood by those skilled in the art that the flow rate, line pressure, subcoooling, flow coefficient, and external cooling and insulation of the delivery device, which can be a pipe or tube, will have to be adjusted to meet the high temperatures in the polymerization reactor, i.e., about 60 to about 110 degrees C. While it would be most efficient to have at least about 90 percent of the cryogen in the liquid phase and less than about 10 percent in the gas phase, the ratio of liquid to gas can be less, even lower than 50:50, provided that there is enough liquid cryogen present to be receptive to temperature control by computer or otherwise.

The liquid cryogen can be introduced at one or more locations in the fluidized bed reactor. The selection of location depends on the size and shape of the reactor and the position of the fluidized bed. The introduction can be effected through the use of nozzles having fine orifices. Nozzles used in condensing mode operation are discussed in U.S. Pat. No. 5,541,270. The introduction of the liquid cryogen is usually most effective at the bottom of the bed. The liquid cryogen, of course, vaporizes immediately in the bed upon release having a cooling effect on the fluidized bed. Temperature sensors or thermocouples desirably transmit the changes in temperature to a computer, which controls the amount and rate of liquid cryogen introduction. The nozzles are connected to tubing or piping, which are used to transmit the liquid cryogen from its source, for example a storage tank under a pressure of 35 to 100 psig. The pressure should be maintained to the extent possible up to the use point. This can be accomplished by having a well-sealed control valve very close to the use point. The tubes or pipes are well insulated and preferably cooled with a liquid medium running through a shell surrounding the tube.

An alternative use of the cryogenic liquid is to feed it into the reactor together with the catalyst. This provides a localized cooling effect on the very reactive catalyst improving the efficiency of the operation. This procedure can be carried out in tandem with the simulated condensing mode process or independently with the various gas phase, solution, or slurry polymerization processes.

A typical fluidized bed reactor can be described as follows: The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are a vessel, a bed, a gas distribution plate, a compressor, a heat exchanger, inlet and outlet piping, and a product discharge system. In the vessel, above the bed, there is a velocity reduction zone, and, in the bed, a reaction zone. Both are above the gas distribution plate. While fines, entrained in the recycle gas stream, can be removed, for example, by using a cyclone separator or some sort of filter means, if they are not excessive, i.e., such that the fines would cause "mud" to form in the recycle line, the fines can simply be recycled. The recycle stream is introduced below the gas distribution plate and becomes the fluidizing gas, which supports the bed, and its velocity must be such that it can do so, typically a superficial gas velocity of at least about 1.2 to about 6 feet per second. This gas stream can provide conventional cooling assistance to the extent desired. The means for at least partially cooling the fluidized bed below the sticking or agglomeration point of the polymer and for at least partially removing the exothermic heat of polymerization is the evaporation of the liquid cryogen into the bed. By removing the exotherm, an isothermal, steady state condition is reached, i.e., where the bed temperature is about equal to the temperature of the outlet recycle gas stream. The amount of cooling provided by the liquid cryogen is determined by the operator and is based on cost; the available reactor equipment; and the particular polymerization process selected. The process of the invention can even be used to assist conventional condensing mode processes and the conventional condensing mode can be used to assist the process of this invention.

A typical fluidized bed reactor is described in more detail in U.S. Pat. No. 4,482,687.

Again in polyethylene production, for example: The gaseous feed streams of ethylene, other gaseous alpha-olefins, and hydrogen, when used, are preferably fed to the reactor recycle line as well as liquid alpha-olefins and the cocatalyst solution. The low boiling hydrocarbons can be essentially avoided in the instant process except where they are needed as mediums for carrying catalyst components, or they can be reduced. Optionally, the liquid cocatalyst can be fed directly to the fluidized bed. The partially activated or completely activated catalyst precursor is preferably injected into the fluidized bed as a solid or a mineral oil slurry. In the case of partial activation, activator is added to the reactor. The product composition can be varied by changing the molar ratios of the comonomers introduced into the fluidized bed. The product is continuously discharged in granular or particulate form from the reactor as the bed level builds up with polymerization. In addition to heat removal, the production rate is controlled by adjusting the catalyst feed rate and/or the ethylene partial pressure.

The hydrogen:ethylene molar ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

The residence time of the mixture of reactants including gaseous and liquid reactants, catalyst, and resin in the fluidized bed can be in the range of about 1 to about 12 hours and is preferably in the range of about 2 to about 5 hours.

Several steps can be taken, in addition to temperature control, to prevent agglomeration. The product discharge line between the reactor and the product pot is often plugged up with chunks between intervals of product drops. A continuous purge flow of nitrogen or reactor gas in the line prevents the plugging problem. Also, coating the reactor surface with a low surface energy material is shown to be beneficial to slow down the rate of fouling build up. In addition, control of the electrostatic level in the bed prevents static induced particle agglomeration.

Static can be adjusted to a satisfactory level by controlled use of reaction rate, avoidance of quick change of gas composition, selective use of static-neutralizing chemicals and surface passivation with aluminum alkyls. It is preferred to control the static in the reactor system during start-up. If the static is not controlled, static induced layers of catalyst rich fines can form on the reactor surfaces. These fines may, in turn, induce localized hot spots and the formation of chunks. Reactor surface passivation with an aluminum alkyl minimizes the formation of fines layers. This passivation is accomplished by first building up the aluminum alkyl concentration in the start-up bed to about 300 to 1000 ppm based on the weight of the bed, and then fluidizing the bed with purified nitrogen or ethylene for several hours. At the end of this passivation period, the reactor is purged while maintaining the circulation, the reaction conditions are established, and the reaction is kicked off by feeding catalyst into the system. If static still persists, additional purges or selective use of static neutralizing chemicals may become necessary to reduce the level of static.

The product resin can be extruded into film or other forms in conventional extruders adapted for that purpose. Extruders and processes for extrusion are described in U.S. Pat. Nos. 4,814,135; 4,857,600; 5,076,988; and 5,153,382. Examples of various extruders, which can be used in forming film are a single screw type such as one modified with a blown film die and air ring and continuous take off equipment, a blown film extruder, and a slot cast extruder. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C.

The advantages of the invention are found in (1) permitting those, who wish to essentially avoid or reduce the hydrocarbons introduced into fluidized bed reactor systems, to do so; (2) reducing impurities in the resin product; (3) reducing the problems of static, chunking, sheeting, and excess liquid in the bed insofar as they are caused by impurities introduced using conventional "condensing mode" techniques; (4) avoiding the need to condense the recycle gas or making condensation optional; (5) reducing dependence on the recycle gas for heat removal and the significance of dew point; (6) reducing the need for certain equipment such as condensers and other cooling devices; (7) not disturbing the fluidization characteristics of the bed; and (8) adding a common reactor component, nitrogen or another inert gas, to the fluidizing gas.

Conventional additives, which can be introduced into the product resin, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Patents mentioned in this specification are incorporated by reference herein.

What is claimed is:

1. A process comprising contacting one or more monomers with a catalyst, in the gas phase, under polymerization conditions, in a fluidized bed reactor, with the proviso that the reactor is at least partially cooled internally by the vaporization of a liquid cryogen directly into the reactor.

2. The process defined in claim 1 wherein the liquid cryogen is vaporized directly into the fluidized bed at one or more locations.

3. The process defined in claim 1 wherein the process is continuous; polymer product and unreacted monomer(s) are removed from the fluidized bed; and the unreacted monomer(s) are recycled, essentially in the gas phase, through the fluidized bed, a portion of said unreacted monomer(s) polymerizing and a portion of said unreacted monomer(s) providing the fluidizing medium.

4. The process defined in claim 2 wherein the amount of liquid cryogen vaporized directly into the reactor is controlled in order to assist in maintaining the fluidized bed at a desired temperature.

5. The process defined in claim 3 wherein additional monomer is added to the recycled monomer(s).

6. The process defined in claim 2 wherein the monomer(s) can be initially in gaseous or liquid form.

7. The process defined in claim 4 wherein the control is effected by a computer.

8. The process defined in claim 3 wherein the monomers are olefins.

9. The process defined in claim 8 wherein the major proportion of olefin is ethylene or propylene and the minor proportion of olefin is one or more alpha-olefins having up to 12 carbon atoms.

10. A process comprising contacting one or more olefin monomers, initially in gas or liquid form, with a catalyst, in the gas phase, under polymerization conditions, in a fluidized bed reactor, with the provisos that:

(i) the reactor is at least partially cooled internally by the vaporization of a liquid cryogen directly into the fluidized bed of the reactor at one or more locations;

(ii) the amount of liquid cryogen vaporized directly into the reactor is computer controlled in order to assist in maintaining the fluidized bed at a desired temperature;

(iii) the process is continuous; polymer product and unreacted monomer(s) are removed from the fluidized bed; and the unreacted monomer(s) are recycled, essentially in the gas phase, through the fluidized bed, a portion of said unreacted monomer(s) polymerizing and a portion of said unreacted monomer(s) providing the fluidizing medium;

(iv) additional monomer is added to the recycled monomer(s) prior to entry into the fluidized bed; and (v) the major proportion of olefin monomer is ethylene or propylene and the minor proportion of olefin monomer is one or more alpha-olefins having up to 12 carbon atoms.

11. The process defined in claim 1 wherein at least part of the cryogenic fluid is introduced together with the catalyst.

* * * * *